United States Patent [19]

Arai et al.

[11] Patent Number: 4,559,776
[45] Date of Patent: Dec. 24, 1985

[54] CATALYTIC CONVERTER MOUNTING STRUCTURE FOR ENGINES

[75] Inventors: Sakuji Arai; Katsuaki Sato; Susumu Kochi; Hiroaki Hishida, all of Saitama, Japan

[73] Assignee: Honda Giken Kogyo Kabushiki Kaisha, Tokyo, Japan

[21] Appl. No.: 529,689

[22] Filed: Sep. 6, 1983

[30] Foreign Application Priority Data

Sep. 8, 1982 [JP] Japan .......................... 57-136481[U]

[51] Int. Cl.[4] ........................ F02B 37/00; F01N 7/00
[52] U.S. Cl. ........................................ 60/280; 60/322; 60/605
[58] Field of Search ...................... 60/280, 322, 605; 180/296

[56] References Cited

U.S. PATENT DOCUMENTS

| 3,798,906 | 3/1974 | Woollenweber | 60/280 |
| 3,902,853 | 9/1975 | Marsee | 60/322 |
| 3,942,599 | 3/1976 | Shimada | 180/296 |
| 4,074,525 | 2/1978 | Salver | 60/322 |
| 4,339,919 | 7/1982 | Jobling | 60/322 |

FOREIGN PATENT DOCUMENTS 2407471  8/1975  Fed. Rep. of Germany ...... 180/296

Primary Examiner—Douglas Hart
Attorney, Agent, or Firm—Lyon & Lyon

[57] ABSTRACT

An exhaust system for a vehicle engine having the catalytic converter structurally mounted on the side of the engine for rigid, non-vibrating support and a flexible tube connecting the catalytic converter to the engine exhaust for absorbing vibrations and accommodating thermal expansion and contraction.

3 Claims, 3 Drawing Figures

CATALYTIC CONVERTER MOUNTING STRUCTURE FOR ENGINES

The present device relates to a catalytic converter mounting structure for the exhaust system of a vehicular engine.

Conventionally in a vehicle exhaust system the catalytic converter is disposed somewhere along the exhaust pipe of the engine so that noxious components existing in the engine exhaust gas such as HC, CO or $NO_x$ may be converted and removed.

The means for supporting such catalytic converter are basically of two types, namely, means for supporting the catalytic converter on the engine body and means for supporting same on the vehicular body. In the former case, the catalytic converter is supported according to the prior art on the engine body through a bracket or the like so that the exhaust system including the catalytic converter will not resonate in response to the vibrations of the engine. However, there arises a disadvantage that the aforementioned bracket is ineffective to reduce the vibrations if it is soft or flexible whereas it cannot absorb the thermal deformation of the exhaust system if it is rigid. On the other hand, an arrangement for supporting the catalytic converter on the vehicular body is effective for absorbing the vibratory displacement of the exhaust system but since the catalytic converter is spaced a distance from the engine there arises the disadvantage that the heat of the exhaust gas introduced into the catalytic converter is lower thereby reducing the cleaning efficiency of that converter.

It is, therefore, a principle object of the present invention to provide a simply constructed catalytic converter mounting structure for an engine, in which the catalytic converter is positioned in the vicinity of and firmly fixed to the engine body and in which the catalytic converter and the exhaust pipe are connected to each other by means of a flexible connecting pipe so that the hot exhaust gas may be introduced immediately into the catalytic converter thereby to enhance the cleaning efficiency of the converter while preventing the resonance coming from the engine vibrations while absorbing the thermal expansion and contraction of the exhaust system, including the catalytic converter, thus eliminating the aforementioned disadvantages.

The present device will be described in connection with one embodiment thereof with reference to the accompanying drawings.

Figure 1:
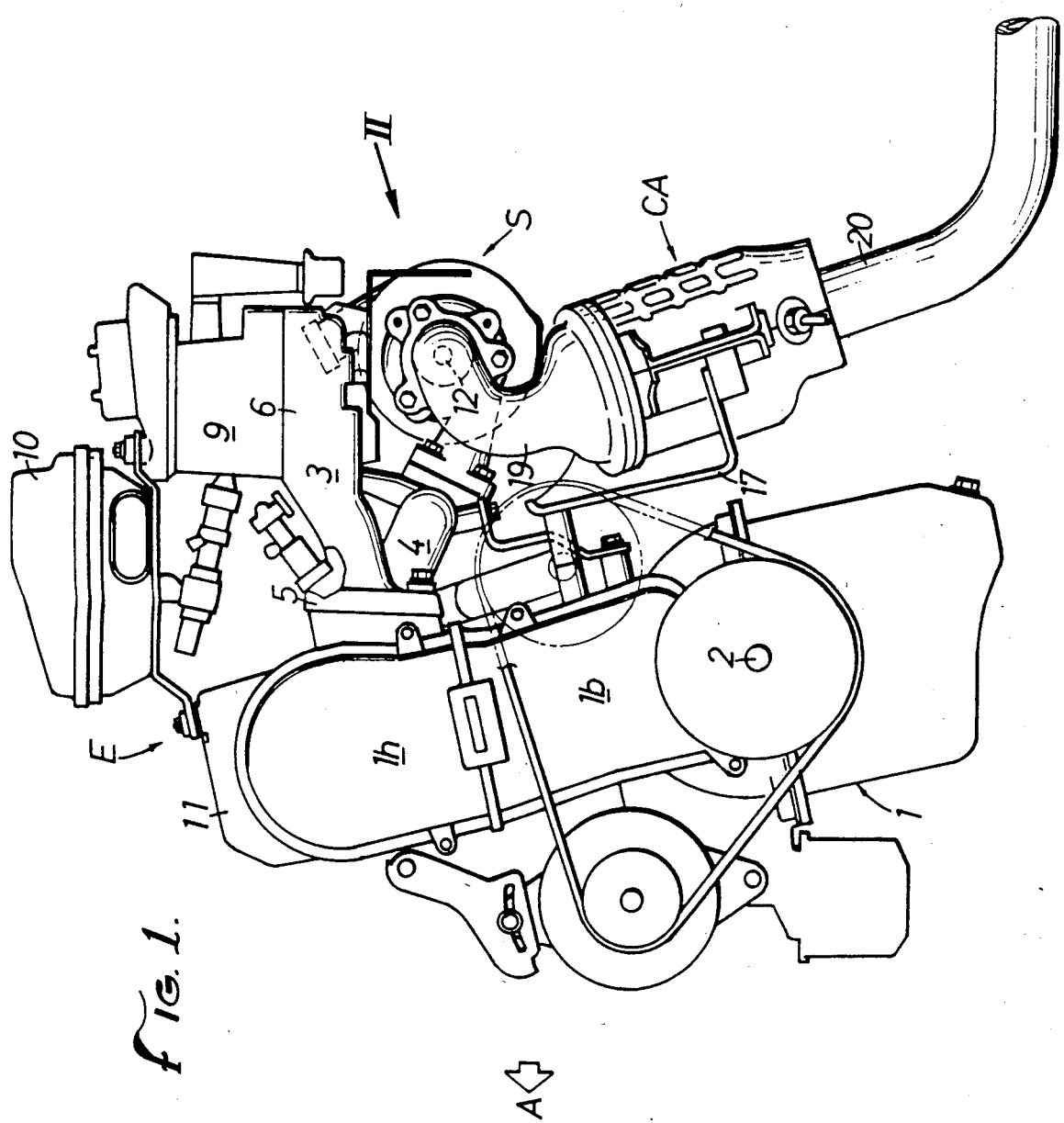
FIG. 1 is an end view of an engine and the exhaust system of this invention.
Figure 2:
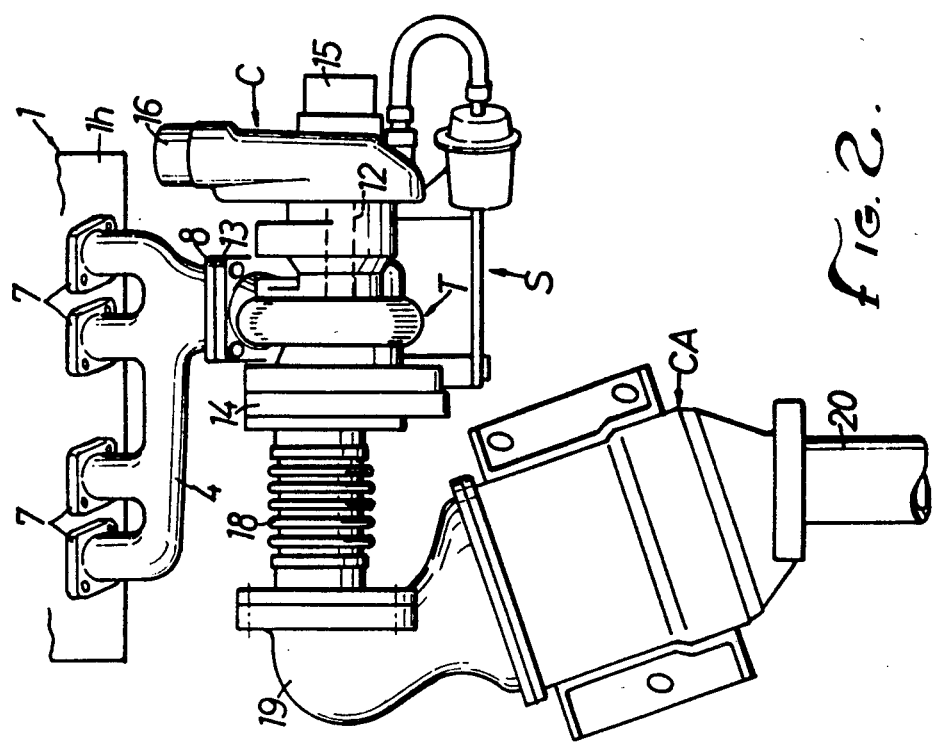
FIG. 2 is a side view of the exhaust system taken in the direction of the arrow "II".

In FIGS. 1 and 2, an engine E is transversely arranged so that the crankshaft 2 of the engine body 1 is oriented perpendicular to the direction the vehicle travels (which is indicated by arrow A in FIG. 1). The engine E preferably is of a counter-flow type wherein the intake manifold 3 and the exhaust manifold 4 both are arranged on the back of the engine body 1. The intake manifold 3 has its plural outlet ends 5 each connected to an intake port, which is opened in the back of the cylinder head 1h of the engine body 1. The intake manifold 3 has its inlet terminal 6 connected with a fuel supply device 9 such as an electronic fuel injector or a carburetor. The exhaust manifold 4 has its plural inlet ends 7 firmly fixed to each of the exhaust ports, which also open to the back of the cylinder head 1h of the engine body 1 and its outlet end 8 connected directly and firmly to the entrance 13 of an exhaust turbine T. Between the head cover 11 of the engine body 1 and the upper surface of the fuel supply device 9, there is supported an air cleaner 10 which has communication with the aforementioned fuel supply device 9.

The aforementioned exhaust manifold 4 extends at an inclination backward and downward below the intake manifold 3. A turbo supercharger S is arranged at the back of the exhaust manifold 4. This turbo supercharger S is equipped with an exhaust turbine T and a turbo compressor C, which are connected by a rotating shaft 12 arranged generally in parallel with the crankshaft 2 of the aforementioned engine body 1. The exhaust turbine T is arranged near the transverse center of the engine body 1 whereas the turbo compressor C is arranged on one side of the exhaust turbine T and near one end of engine E.

As clearly seen from FIG. 2, the outlet end 8 of the exhaust manifold 4 is offset transversely of the engine body 1. The entrance 13 of the exhaust turbine T of the turbo supercharger S is directly connected to that outlet end 8. The turbo compressor C has its suction port 15 connected to the air cleaner 10 and its discharge port 16 connected to the fuel supply device 9 so that the intake air from the air cleaner 10 is supercharged by that turbo compressor C for introduction through the intake manifold 3 into the engine body 1.

At the back of the engine body 1, an exhaust cleaning catalytic converter CA is vertically arranged in the open space formed at the side of the aforementioned exhaust turbine T and close to the engine body 1 and generally parallel to the near-vertical axis of said body. That catalytic converter CA is firmly fixed to the cylinder block 1b of the engine body 1 by a bracket 17 and has its upper inlet end connected to one end of a flexible connecting tube 18 by virture of an upper exhaust pipe 19 bent generally at a right angle. The other end of said connecting tube 18 is connected to the exit 14 of the exhaust turbine T. The outlet from the bottom of the catalytic converter CA is vented to the atmosphere through a lower exhaust pipe 20 and a muffler (not shown).

When the aforementioned engine E is running, the exhaust gas flows through the exhaust manifold 4 and then through the exhaust turbine T with the exhaust energy driving said exhaust turbine T. The exhaust gas passes through the catalytic converter CA in which it is cleaned for being discharged to the atmosphere. Since the compressor C is driven by the exhaust turbine T through the rotating shaft 12, the intake air from the air cleaner 10 is supercharged by that compressor C and introduced through the intake manifold 3 into the engine body 1.

Figure 3:
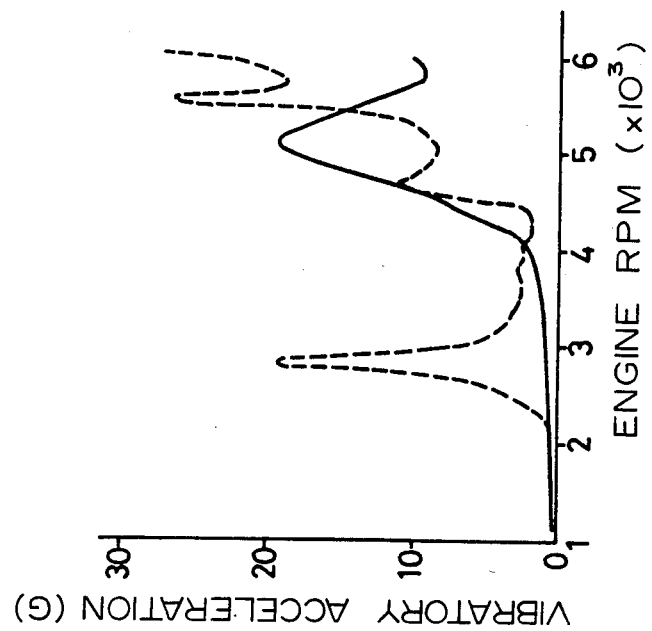
FIG. 3 is a graph illustrating the performance characteristics of this invention as compared to the prior art.

Since the catalytic converter CA is arranged physically close to the engine body 1 with only a short distance for the exhaust gas to travel, the exhaust gas is still very hot when it is introduced into the catalytic converter CA thereby enhancing the cleaning efficiency. Moreover, the running vibrations of the engine body 1 are absorbed, at least in substantial part, by the aforementioned flexible connecting tube 18 so that they are inhibited from being transmitted to the exhaust system, including the catalytic converter CA. As a result, said exhaust system is prevented from resonating in response to the aforementioned vibrations. FIG. 3 is a graph in which the vibratory acceleration (G) of the exhaust system including the aforementioned catalytic converter CA is plotted against the r.p.m. of the engine E. In the graph, the solid line curve indicates the present device whereas the dashed line curve indicates the prior art. As is apparent from that graph, the vibrations of the exhaust system of the present invention are greatly reduced within an engine r.p.m. range of 2000 to 4000 r.p.m. over the system of the prior art.

What is claimed:

1. An exhaust system for multiple cylinder-in-line engine having the exhaust ports on one side, comprising, an exhaust manifold having means connected to each exhaust port and extending substantially the length of the engine with ends located at the extreme ends of the exhaust ports, said exhaust manifold having an outlet located near one end and facing outwardly from the engine, a turbo supercharger having an exhaust gas inlet connected directly to said exhaust manifold outlet and an exhaust gas outlet facing parallel to the engine length and toward the other end of said exhaust manifold, a flexible exhaust tube connected to said turbo supercharger exhaust gas outlet and extending therefrom substantially parallel to the engine for a distance short of the other end of the engine, an elongated catalytic converter having an inlet connected to said flexible exhaust tube, said catalytic converter extending downwardly with an outlet at the bottom for connecting to an exhaust pipe, a substantially rigid bracket having means connecting same to the engine and said catalytic converter for structurally supporting the catalytic converter from the engine, and said flexible exhaust tube including means for accommodating thermal expansion and absorbing vibration between said turbo-supercharger and said catalytic converter.

2. The exhaust system of claim 1 wherein said catalytic converter includes a substantially right angle connection at its inlet for connecting horizontally to said flexible exhaust tube.

3. The exhaust system of claim 1 wherein said flexible exhaust tube comprises a short tubular member corrugated along its length.

* * * * *